United States Patent [19]

Caulkins

[11] 4,014,540
[45] Mar. 29, 1977

[54] SWING MOUNT FOR PLAYGROUND EQUIPMENT

[75] Inventor: Ted L. Caulkins, Hillsdale, Mich.

[73] Assignee: Game Time, Inc., Litchfield, Mich.

[22] Filed: Mar. 31, 1975

[21] Appl. No.: 563,775

[52] U.S. Cl. .................................. 272/85; 248/341; 308/DIG. 3; 308/DIG. 7; 308/DIG. 8; 403/27

[51] Int. Cl.² ......................................... A63B 31/00

[58] Field of Search ............ 272/85; 248/341, 349, 248/350, 343, 489, 17, 458, 462; 308/DIG. 3, DIG. 7, DIG. 8, 188, 189 R, 189 A, 190, 221; 403/128, 130, 131, 165, 27

[56] References Cited
UNITED STATES PATENTS

| 1,167,836 | 1/1916 | Pratt | 116/114 Q |
|---|---|---|---|
| 2,285,883 | 6/1942 | Anderson | 248/341 X |
| 2,325,456 | 7/1943 | Williams | 272/85 |
| 2,452,120 | 10/1948 | Gorne | 248/341 |
| 2,484,173 | 10/1949 | Leas | 272/85 |
| 2,545,295 | 3/1951 | Miller | 272/85 |
| 3,011,219 | 12/1961 | Williams | 308/DIG. 7 |
| 3,023,038 | 2/1962 | White | 404/130 |
| 3,056,380 | 10/1962 | White | 116/114 Q |
| 3,130,969 | 4/1964 | Groth | 272/85 |
| 3,261,388 | 7/1966 | Kovac et al. | 116/114 Q |
| 3,363,921 | 1/1968 | Gottschald | 403/131 X |

Primary Examiner—Richard C. Pinkham
Assistant Examiner—T. Brown
Attorney, Agent, or Firm—Merchant, Gould, Smith, Edell, Welter & Schmidt

[57] ABSTRACT

A ball and socket joint for a swing for providing simultaneous swiveling and pivoting motion in any direction. The ball is preferably molded with an inner core and an outer shell of different colored materials. As material from the outer shell is worn away in normal wear, exposure of the inner core indicates visually the extent of wear which has taken place. A retainer member placed in load bearing relationship between a support bolt for the swing and the ball is intentionally made larger than the opening at the base of the socket to prevent the swing from dropping in case of breakage of the ball.

6 Claims, 3 Drawing Figures

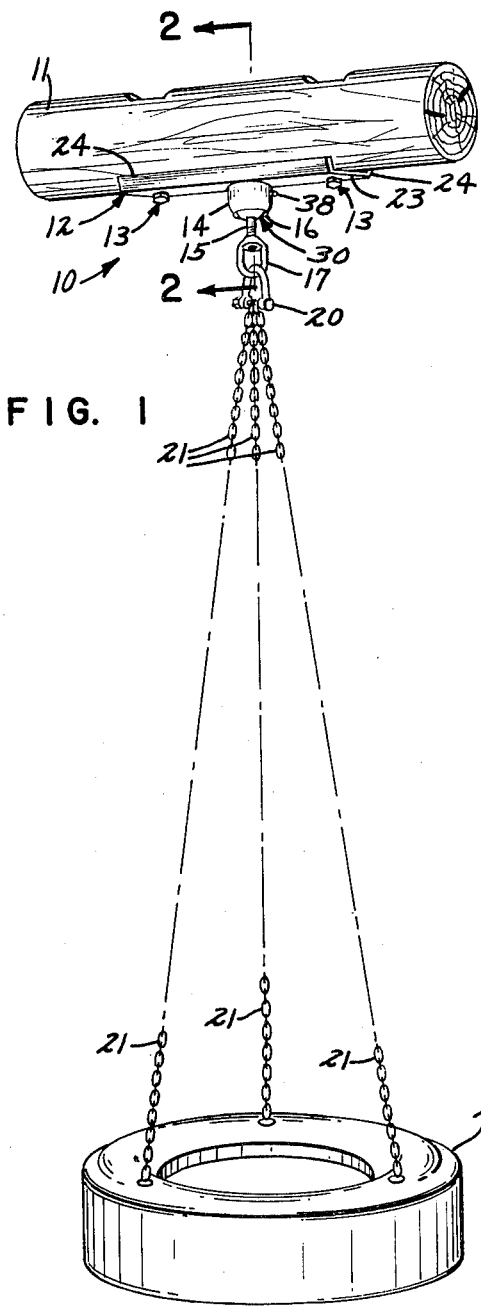
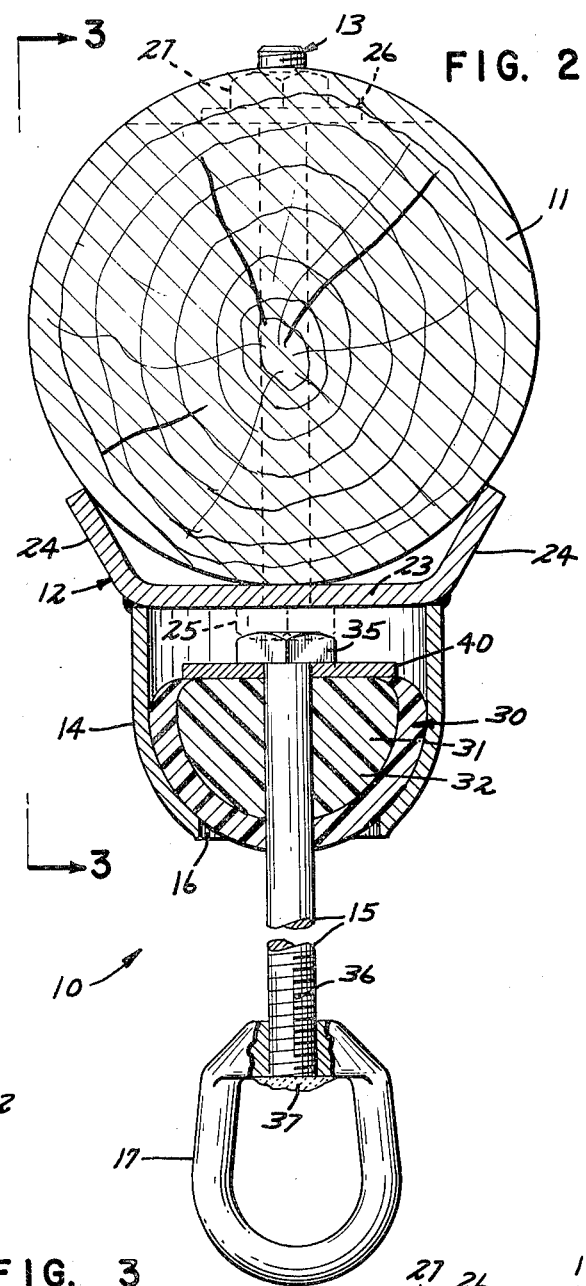
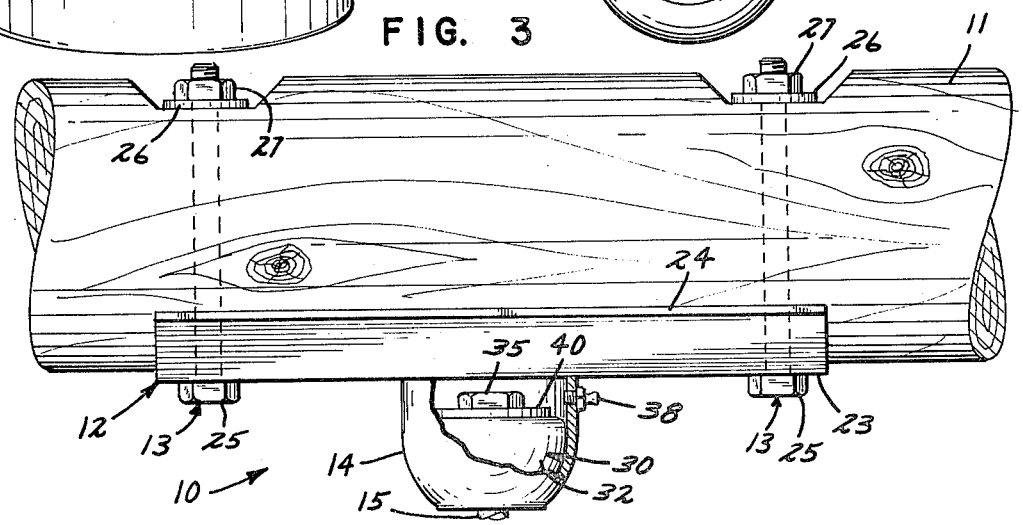
FIG. 1
FIG. 2
FIG. 3

SWING MOUNT FOR PLAYGROUND EQUIPMENT

BACKGROUND OF THE INVENTION

The present invention pertains generally to the field of playground equipment, and more specifically to a mount or pivot for a certain class of playground swings.

In conventional playground swings, the swing and mount are designed primarily for oscillation throughout an angle in one plane. In another type of swing, oscillatory motion in any direction throughout a solid angle is contemplated. Additionally, rotation of the swing about an axis from the seat of the swing to the mount is sometimes desirable. Swings of this latter type are referred to herein as "tire swings", in accordance with customary usage in the field resulting from the fact that an automobile tire is often used for the seat in such a swing. However, it will be understood that as used herein, the term "tire swing" includes all swings designed for swinging in all directions rather than primarily in a single plane, regardless of whether the seat of the swing is made of a tire or other material.

In general, a tire swing includes a frame or other overhead support,; a seat; ropes, chains, or cable, or possibly a solid member for suspending the seat; and a swing mount or pivot for providing the support and allowing motion between the support and the members which suspend the seat.

In prior art tire swings, various types of swing mounts have been used. These range from a simple hook, eye or pin, to a universal joint. In the case of a simple hook, eye or pin, the only bearing surface provided is the rubbing of the chain of cable on the fixed mount. This rubbing may lead to rapid wearing of the chain or mount resulting in failure. Additionally, unless a separate swivel is provided, rotation of the swing can be accomplished only by winding up the chains or cables which support the seat, and this winding represents a potential safety hazard because children's fingers and hair can get caught in the winding chains.

The use of a universal joint overcomes one shortcoming of the simpler type mount discussed above, in that it can potentially provide longer wearing bearings. However, like the simple mount discussed above, if a separate swivel is not provided, the universal joint will still be subject to the chain or cable winding situation and its attendant dangers. Additionally, due to the nature of its construction, the universal joint has many pinch points which pose a potential hazard. If the children were to stand on the seat or climb up the chains, they could get their hands in the universal joint in such a position that, if the swing were then to the moved, the fingers could be jammed between moving parts of the universal joint. Another problem with universal-type joints, depending upon their individual construction, is that the pivots or bearing surfaces are potentially exposed to the element and may therefore be subject to corrosion resulting in shorter life.

SUMMARY OF THE INVENTION

In order to overcome these and other problems existing in the prior art, the present invention provides a ball and socket mount for swings and other playground equipment requiring similar motions. A housing defining a socket having an aperture therein is adapted for mounting to a swing support. A ball is placed inside the socket conforming to the shape and dimensions thereof to provide the load bearing surface. A load bearing member extends through a central bore in the ball and through the aperture in the socket. Means are provided for attaching a swing suspending cable or chains to the load support member. Because the ball is capable of rotating in the socket as well as swinging through a limited angle in any direction, the hazards of winding up of the chains are eliminated. Because most of the ball is protected within the socket, contamination and corrosion from exposure to weather is minimized. Additionally, the ball and socket structure provides a smaller number of pinch points for fingers or hands.

According to one embodiment of the invention, the ball is composed of a central core, and an outer shell molded thereround. The core and shell are made of different colored material, to serve as a visual wear indicator should the outer shell wear through.

According to another feature of the preferred embodiment, a retaining member is positioned in load bearing relationship between the load support member and the ball. The retaining member is sized large enough so that it will not fall through the aperture in the socket, in case the ball should break or disintegrate.

BRIEF DESCRIPTION OF THE DRAWING

In the Drawing, FIG. 1 is a view in perspective of a tire swing, portions thereof being broken away, using a swing mount according to the present invention;

FIG. 2 is an enlarged vertical section taken generally along line 2—2 of FIG. 1; and FIG. 3 is an elevational view taken generally along line 3—3 of FIG. 2.

DESCRIPTION OF THE PREFERRED EMBODIMENT

In FIG. 1, reference numeral 10 generally designates the swing mount according to the present invention. Reference numeral 11 designates a portion of a suport beam for the swing. Support 11 may be a log as shown in FIG. 1, or it may be a metal or other type of beam. Support 11 is part of a frame for the swing, and is held generally horizontally the desired distance above the ground by suitable frame members which would be attached to the ends of support 11, not shown in FIG. 1.

A saddle bracket 12 is attached to support 11 by means of a pair of bolts 13. Attached to the saddle bracket 12 is a housing 14 which defines a socket. A ball is positioned inside the socket, and a load supporting stem 15 extends from the socket through an aperture 16.

An eye 17 is attached to the end of the load supporting stem 15. A clevis and clevis pin generally designated by reference numeral 20 is used to connect the eye 17 to the chains 21. The other end of chains 21 are connected to the seat 22, which in the embodiment shown in FIG. 1 comprises a tire, by any suitable means (not shown). It will be understood that any type of seat might be used in place of the tire 22 shown. Likewise, cables or ropes or other means for suspending the seat from the swing mount might be used in place of the chains 21.

Referring now to FIG. 2, the support 11 is shown in cross section. In the case of a cylindrical support log, bracket 12 is preferably formed in a saddle shape with a central portion 23 and edge portions 24 which are bent up at an angle to provide a more secure mounting to support 11. In the case of a rectangular or other flat bottomed support, the bracket 12 could comprise only the flat portion 23; or, the outer portions 24 could be bent at right angles and spaced apart by a dimension corresponding to the width of the support.

As shown in FIGS. 2 and 3, bolts 13 pass through holes in bracket 12 and support 11. Bolts 13 have heads 25 and threaded ends on which are placed washers 26 and nuts 27. Flat spots are shown cut into the top of support 11 to provide good attachment points for washers 26 and nuts 27.

Housing 14, which defines the socket, is preferably welded to the bracket 12. The aperture 16 is sized in consideration of the extent of angular motion which the mount is to provide, and also in consideration of the strength and support required in view of the load to be transmitted to the socket by the ball.

As shown in FIGS. 2 and 3, the ball 30 is positioned inside the socket. In the preferred embodiment, the ball is not a complete sphere, but is a segment of a sphere. The generally spherical surface is in contact with the socket, and the ball has a flat side positioned generally away from the aperture 16 of the socket. In the preferred embodiment, the ball comprises somewhat more than a hemisphere, with the edges between the spherical surface and the flat side being rounded off, so as to provide smooth action of the ball inside the socket.

The ball has a central bore therethrough, and the load supporting stem 15, which in the preferred embodiment comprises a lag bolt, is positioned in the central bore, as shown in FIG. 2. The lag bolt 15 has a head 35 positioned within the socket above the ball, and a shank, the end portion of which contains threads 36. The eye 17 is threaded onto the bolt 15, and is welded in place as indicated at 37.

A safety retainer 40, which in the preferred embodiment comprises a washer, is placed on the lag bolt and is held in place between the flat surface of the ball and head 35 of the lag bolt. The ball and the safety retainer are thus attached to the head of the load supporting stem 15, in the sense that loads placed on the load supporting stem pull the head 35 and the safety retainer 40 into load bearing contact with the ball 30. The load is then transferred by the ball to the socket. Of course, the safety retainer 40 and the head 35 of the bolt need not be rigidly secured to each other or to the ball, since normal loads hold them in position.

A grease fitting 38 is provided in the housing 14 so that the space within the socket around the ball can be filled with grease.

The ball 30 in the preferred embodiment is molded from nylon in a two-step process. The ball 30, as shown in FIG. 2, comprises an inner core 31 and an outer shell 32. The inner core 31 is first formed, then the outer shell 32 is molded therearound. The formation of the ball with the two layers serves a dual purpose. In the molding of the ball, it helps reduce shrinkage due to cooling which might otherwise cause the ball to pull away from the mold and make an irregular or uneven outer surface. However, in the two-step process, the shrinkage on cooling of the outer surface is minimized since only the relatively small amount of plastic material in the outer shell is subject to cooling and shrinking in the final step. Any shrinking of the inner core during its own molding process is immaterial, since any loss in thickness is made up in the molding in the outer shell. The use of a two-step molding and remolding process to eliminate shrinkage is known in the plastics molding art.

However, another reason for the two-part construction of the ball in the present invention is that it provides a means for visual determination of wear on the ball. The inner core and the outer shell, although both molded from nylon, may contain coloring agents so that the inner core and outer shell are of different colors. In use, some of the material of the outer shell will be worn away over a period of time through normal use. When the outer shell is worn to the point that the inner core is visible in places, this can serve as an indication that the ball should be replaced. Visual inspection can be performed on the portion of the ball visible through aperture 16, as the stem 15 is moved through its extreme arc.

In the preferred embodiment, safety retainer 40 is intentionally sized larger than aperture 16, so that it will not pass therethrough. Additionally, retainer 40 should be made of thick enough and strong enough material to support the weight of the swing and occupants against the socket in case the nylon ball should break or disintegrate. Should this happen, the load support stem and the seat and occupants of the swing might drop an inch or two, but the safety retainer 40 would engage the socket to prevent the swing from dropping free.

It will also be appreciated that by providing both threads and a weld to hold eye 17 to the lag bolt 15, added safety is obtained because the thread will still support the load in case the weld should fail.

What is claimed is:

1. A ball and socket playground swing suspension mount, comprising:
    a. a member defining a socket having an aperture therein, said socket having an inner portion shaped substantially as a portion of the inner surface of a hollow sphere;
    b. means for attaching said member to a swing support frame;
    c. A ball positioned within the socket, said ball having a portion of its surface comprising a segment of a sphere, said segment having a shape and size to conform to said inner portion of said socket, and another portion thereof generally planar and positioned away from said aperture, said ball having a bore therethrough along an axis generally perpendicular to said generally planar side;
    d. a load supporting bolt positioned within said bore having its head adjacent said generally planar side and its opposite and extending through said aperture in the socket, said opposite end being adapted for attachment to a playground swing; and
    e. a retainer member, having a bore therein and positioned along said bolt between the head of said bolt and said generally planar side of said ball, said retainer member being dimensioned larger than said aperture to prevent said bolt from dropping through said aperture in case of breakage of the ball.

2. Apparatus according to claim 1 wherein said retainer member comprises a washer having a diameter greater than said aperture.

3. Apparatus according to claim 1 wherein said ball has an inner core and an outer shell molded therearound, and wherein said core and shell are made of materials having different colors, so as to provide visual wear indication.

4. A ball and socket playground swing suspension mount, comprising:

a. a member defining a socket, said socket having an aperture formed therein;
b. a ball positioned within said socket; and
c. a load support member attached in load bearing relationship to said ball and extending through said aperture for swiveling and limited angular movement therein;
d. wherein said ball comprises an inner core and an outer shell made of materials having different visual appearance, thereby to provide visual wear indication for said ball.

5. A ball and socket playground swing suspension mount, comprising:
a. a member defining a socket, said socket having an aperture formed therein;
b. a ball positioned within said socket, said ball comprising an inner core and an outer shell made of materials having a different visual appearance, thereby to provide visual wear indication for said ball;
c. a load support member attached in load bearing relationship to said ball and extending through said aperture for swiveling and limited angular movement therein; and
d. a retainer member positioned within said socket to attach said ball to said load support member, said retainer member being dimensioned larger than said aperture to provide support for said load support member in the event of failure of said ball.

6. Apparatus according to claim 5 wherein said ball has a bore therethrough, said load support member extends through said bore and one end thereof extends through said aperture, said one end being adapted for attachment to a swing; and said retainer member comprises a washer of diameter larger than that of said aperture captivated between the opposite end of said load support member and said ball for transfer of load bearing forces therebetween.

* * * * *